Sept. 19, 1967  A. R. WAEHNER  3,343,153
CABLE CONNECTOR HAVING MEANS FOR INDICATING
WHEN CABLE IS ENERGIZED
Filed Dec. 3, 1965  2 Sheets-Sheet 1

INVENTOR.
Albert R. Waehner
BY
Lee H. Kaiser
ATTORNEY

United States Patent Office 3,343,153
Patented Sept. 19, 1967

3,343,153
CABLE CONNECTOR HAVING MEANS FOR INDICATING WHEN CABLE IS ENERGIZED
Albert R. Waehner, Elm Grove, Wis., assignor to McGraw-Edison Company, Milwaukee, Wis., a corporation of Delaware
Filed Dec. 3, 1965, Ser. No. 511,471
3 Claims. (Cl. 340—252)

This invention relates to safety devices for reducing danger to electrical utility crews working on electrical power distribution system and in particular to means for indicating whether high voltage cables of underground electrical power distribution system are energized.

Electrical transformers for underground distribution systems are often installed in vaults below the surface of the earth, and high voltage primary underground cables may be connected to the transformers by means of separable connectors. It is frequently necessary to disengage the male and female connector portions of the connector to de-energize the transformer for maintenance or change out or to sectionalize a loop type system. The separable connectors are not capable of closing or latching in on fault current that may result from defective apparatus connected to the power system. Further most separable connnectors are incapable of interrupting load or charging current to the transformer and should not be opened when the high voltage cable is energized. Space in an underground vault is very limited, and the primary cables are usually bent in relatively large radius curves within the vault, thus making it difficult for the lineman to enter or reach into the vault without coming into contact with the high voltage primary cables. Consequently, the electrical utility lineman should test to see if each cable is energized before reaching into or entering the vault or opening a separable connector by means of a hook stick. Further, the safety practices of many electric utilities prohibit personnel from contacting the cables until positive assurance exists that they are not energized.

Distribution transformers for use in an underground vault are available commercially with test caps permitting the lineman to test whether the transformer is energized by "fuzzing" with a hook stick, but such test caps add appreciably to the cost of the transformer and require valuable space on the transformer cover.

It is an object of the invention to provide a separable connector for a high voltage electrical power cable having means for indicating whether or not the cable is energized.

This and other objects and advantages of the invention will be more readily apparent from the following detailed description when considered in conjunction with the accompanying drawing wherein.

Figure 1:
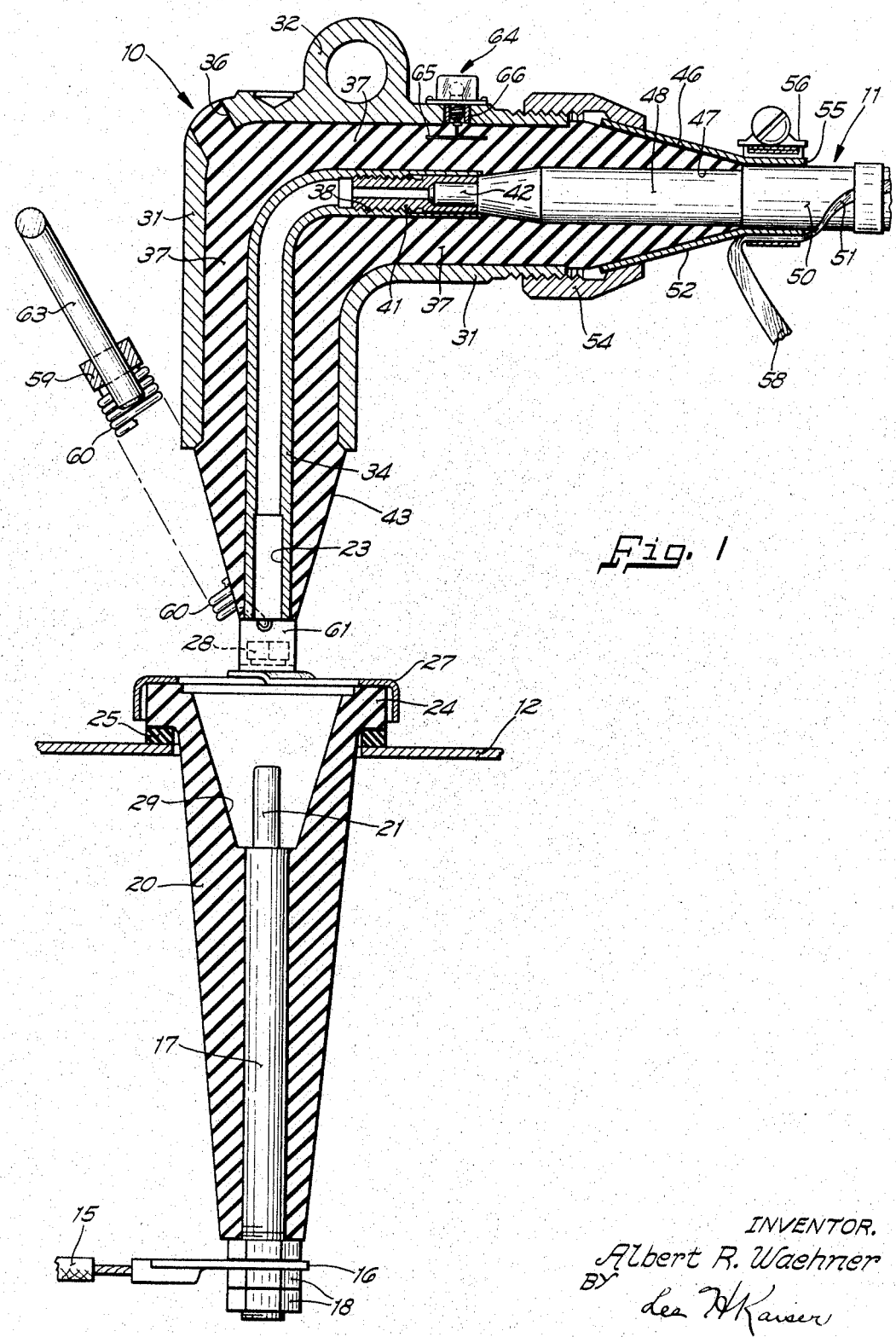
FIG. 1 is a longitudinal sectional view through a separable connector incorporating a preferred embodiment of the invention.

Referring to FIG. 1, a cable termination of the type disclosed in application Ser. No. 459,215 to Ledger J. Tordoff et al., filed May 27, 1965, now Patent 3,307,137, and having the same assignee as the subject invention permits an elbow connector 10 for a shielded high voltage cable 11 to be quickly and easily disconnected from the distribution transformer primary winding (not shown) housed in a grounded metallic casing 12 and having a primary lead 15 crimped to an eye 16 which fits over the threaded end of a conductor rod 17 within casing 12 and is secured to rod 17 by nuts 18. Conductor rod 17 is preferably molded axially within a bushing 20 of suitable insulating material such as epoxy resin and is provided with an upwardly extending metallic male connector portion, or bayonet 21 adapted to mate with a complementary metallic female connector portion, or receptacle 23 of the elbow connector 10. Insulating bushing 20 is generally of frustoconical configuration and has an outwardly extending circumferential flange 24 disposed against the exterior of casing 12 with a resilient gasket 25 compressed therebetween to provide a hermetic seal for casing 12. A split clamp 27 disposed against bushing flange 24 has clearance apertures therein which receive clamping bolts 28 engaged within internally threaded bosses (not shown) welded to casing 12. Insulating bushing 20 has a frustoconical compartment 29 at its upper end.

Elbow connector 10 includes an outer tubular metallic body member 31 having a right angle bend therein and an eye 32 to permit installation and removal by a hook stick. Outer body member 31 surrounds a L-shape interchange member 34 of high conductivity material such as copper disposed within outer body member 31 in spaced relation to the inner surface thereof. A resilient insulating material such as silicone rubber having high dielectric strength is poured within outer body member 31, preferably at the factory, through an aperture 36 and cured therein to form a tubular insulating member 37 between interchange member 34 and body member 31. Interchange member 34 terminates at one end in the receptacle 23 and at the opposite end in a female connector portion, of receptacle 38 having internal threads adapted to mate with a threaded terminal stud 41 crimped on the conductor 42 of primary cable 11. As shown in FIGURE 1, the ends of the interchange member form a conductive inner shield means surrounding each of the releasable connector means. At the bushing end tubular insulating body member 37 terminates in a frustoconical portion 43 surrounding receptacle 23 and adapted to fit within complementary frustoconical compartment 29 in bushing 20. Insulating member 37 at the cable end also terminates in a frustoconical portion 46 surrounding an axial opening 47 for the insulation 48 of cable 12.

Conductor 42 of cable 11 may be surrounded by successive layers of polyethylene insulation 48, semi-conductive material 50, and exposed neutral conductor strands 51. During installation of connector 10, a prefabricated, metallic, electrical stress relief member 52 and an internally threaded draw nut 54 are placed over cable 11 so that the tubular extension 55 on stress relief member 52 is disposed above the semi-conductive material 50 and extends up to the neutral strands 51. The insulation 48 is then inserted into axial opening 47 in insulating body 37, and terminal stud 41 is engaged within the female threads in receptacle 38. Nut 54 is then engaged with external threads on body member 31 and urges stress relief member 52 firmly against frustoconical portion 46 of resilient body member 37. Neutral strands 51 are then folded over the tubular extension 55 on stress relief member 52 and are secured with a compression type clamp 56 which urges stress relief member 52 against the semi-conductive layer 50. Neutral strands 51 are then twisted into a pigtail 58 which may be secured to a grounding rod (not shown) driven into the earth or connected to the grounded casing 12.

When elbow connector 10 is engaged with insulating bushing 20 so that bayonet 21 mates with receptacle 23, connector 10 is normally secured to casing 12 by a bridging bar 59 affixed at its ends to tension hold-down springs 60 disposed on diametrically opposite sides of insulating bushing 20 and having hook-shaped ends engaged within apertures in L-shaped brackets 61 which are secured to casing 12 by the same clamping bolts 28 which affix the split clamp 27 thereto. A threaded aperture at the center of bridging bar 59 receives an eyebolt 63 adapted to accommodate a hook stick, and bridging bar 59 may be lifted over body member 31 and eyebolt 63 turned by means of the hook stick until eyebolt 63 abuts against body member 31 of elbow connector 10, whereby further rotation of eyebolt 63 will tension hold-down springs 60 and thus urge elbow conector 10 against insulating bushing 20.

Figure 2:
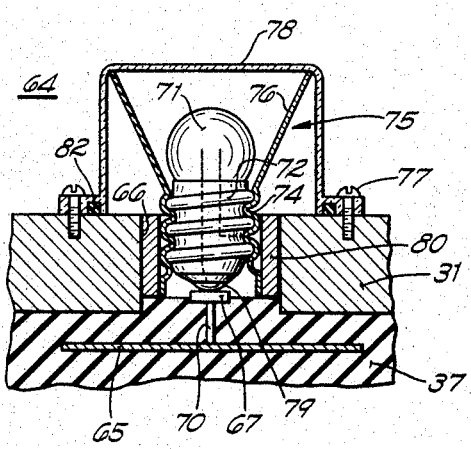
FIG. 2 is an enlarged sectional view through the indicating means of the embodiment of FIG. 1.

It is not intended that the disclosed embodiment of separable connector 10 interrupt load or magnetizing current to the primary winding of the transformer, and disengagement of bayonet 21 from receptacle 23 when the primary winding is energized and drawing load current may result in an arc which will melt the metallic parts 21 and 23 and be a source of danger to the lineman. Elbow connector 10 embodies indicating means 64 for visually displaying when high voltage cable 11 is energized. Indicating means 64 includes a metallic electrode 65 embedded in tubular insulating member 37 in radially spaced relation to grounded metallic outer body member 31 and adjacent an aperture 66 in outer body member 31. A metallic terminal 67 (see FIG. 2) embedded in the outer surface of insulating member 37 within aperture 66 is electrically connected by a conductor 70 to electrode 65. A neon bulb 71 having a screw type base 72 is threaded within the socket portion 74 of a metallic reflector member 75. Socket portion 74 is disposed within aperture 66, and member 75 includes an upwardly extending inverted frustoconical reflector portion 76. A cup-shaped cap 78 of suitable transparent insulating material such as polyethylene engages reflector portion 76 and is releasably secured to outer body portion 31 by screws 77 to retain socket portion 74 within aperture 66 and keep the terminal 79 on the tip of lamp base 72 in engagement with terminal 67. An annular current drain limiting resistor 80 disposed between socket portion 74 and the margin of outer body member 31 defining aperture 66 completes an electrical circuit from the electrode 65, which is capacitively coupled to cable conductor 42, through conductor 70, terminal 67, terminal 79 on lamp base 72, the neon lamp 71, socket portion 74 and annular resistor 80 to the grounded outer body member 31. A continuous resilient gasket 82 compressed within a groove in the bottom surface of cap 78 prevents entry of moisture to lamp 71 even when the vault enclosing connector 10 is flooded.

When the transformer primary winding within casing 12 and cable 11 are energized, a potential gradient exists between cable conductor 42 and grounded outer body member 31, and electrode 65 assumes a potential between that of the cable conductor 42 and ground and provides a source of voltage for glow lamp 71. Glow lamp 71 has a continuous life measured in tens of thousands of hours and thus may be in operation for years before replacement is necessary, and annular resistor 80 limits the current taken by lamp 71 and thus prolongs the lamp life.

Figure 3:
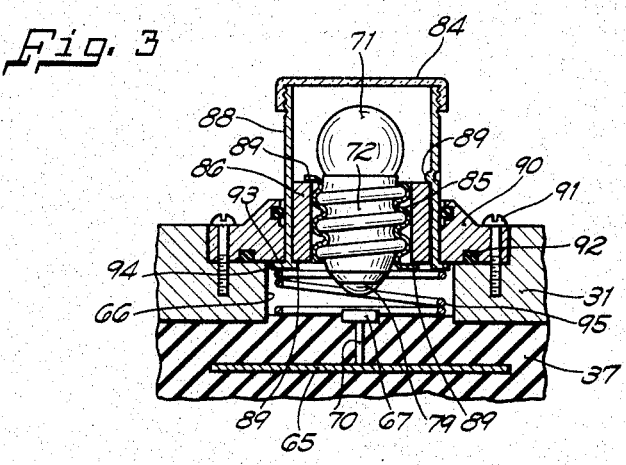
FIGS. 3 and 4 are sectional views through alternative embodiments of the indicating means of the invention.

FIG. 3 illustrates an embodiment of the invention wherein the glow lamp 71 is not lighted continuously but rather is only lighted when the lineman depresses a transparent cup-shaped insulating cap 84 with a hook stick. Glow lamp 71 is engaged within a metallic socket 85 which is surrounded by an annular current drain limiting resistor 86. Resistor 86 may fit within a tubular inner metallic member 88. Circumferentially spaced apart, radially extending bosses 89 on socket 85 and inner member 88 above and below annular resistor 86 unite socket 85, resistor 86, and inner member 88 in an integral assembly so they move together. Cup-shaped cap 84 may be of suitable transparent insulating material such as polyethylene and is threaded onto the upper end of inner member 88 and permits replacement of glow lamp 71. Inner member 88 is slidably telescoped within a metallic outer member 90 which is affixed to grounded body member 31 by screws 91. A continuous resilient gasket 92 compressed within a groove in the bottom surface of outer member 90 prevents entry of moisture to lamp 71. Outer member 90 has a reduced diameter portion forming an annular shoulder 93 on the inner surface thereof, and an outwardly extending circumferential rim 94 on inner member 88 limits upward travel of inner member 88 under the urging of a helical spring 95 disposed between the lower end of inner member 88 and the surface of insulating member 37 exposed within aperture 66. When a lineman pushes down on cap 84 with a hook stick, inner member 88 and lamp 71 are moved downwardly until terminal 79 on lamp base 72 engages terminal 67, thereby completing an electrical circuit for lighting glow lamp 71, which circuit may be traced from electrode 65, conductor 70, terminal 67, terminal 79 on lamp base 82 and lamp 71, socket 85, resistor 86, inner member 88, and outer member 90 to grounded body member 31.

In alternative embodiments an electrical switch (not shown) carried on connector 10 is operated by a hook stick to complete an energizing circuit to lamp 71.

Figure 4:
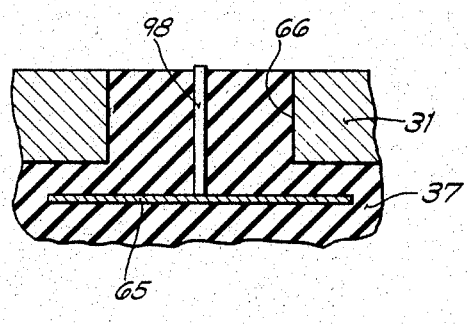

FIG. 4 illustrates an embodiment of the invention which eliminates the neon lamp and permits the lineman to test by means of a hook stick or separate potential measuring means whether or not the transformer primary winding and primary cable 11 are energized. The insulating material of member 37 fills aperture 66, and electrode 65 embedded within insulating member 37 may have a radial terminal portion 98 thereon which extends through aperture 66, in spaced relation to the wall portions of outer member 31 which define aperture 66, to the outer surface of the insulating material within aperture 66 where it is accessible from the exterior of the connector 10. Embedded electrode 65 is capacitively coupled to the conductor 42 of primary cable 11, and electrode 65 and accessible terminal portion 98 assume a potential above ground. Consequently the tip of a hook stick bridged between terminal portion 98 and the grounded body member 31 will draw a "fuzzing" arc which is visible and audible on a 7200 volt transformer. The capacitor coupling is kept low to assure safety of the lineman. Alternatively a glow lamp held by a hook stick in engagement with terminal portion 98 will glow to indicate to the lineman that cable 11 is energized, or other means for measuring potential difference can be connected between terminal portion 98 and grounded outer member 31 as an indication that cable 11 is energized.

While only a few embodiments of the invention have been illustrated and described, many modifications and variations thereof will be readily apparent to those skilled in the art, and consequently it is intended in the appended claims to cover all such modifications and variations which are within the true spirit and intent of the invention.

I claim:

1. In a separable connector for releasably completing an electrical circuit between a high voltage cable having a conductor surrounded by insulation and an outer conductive sheath and the axially disposed conductor rod of an insulating bushing, said connector including an elongated conductive interchange member having releasable connector means on each of its opposite ends for electrically engaging said cable conductor and said bushing conductor rod and including conductive inner shield means surrounding each of said releasable connector means, molded tubular insulation surrounding said interchange member, and a tubular conductive outer shield means surrounding said tubular insulation and being electrically connected to said sheath, the improvement comprising, an enlarged, relatively thin conductive electrode imbedded in said tubular insulation in radially spaced relation from said conductive interchange member and from said tubular conductive member, the circumferential extent of said electrode being less than that of said tubular insulation, said insulation electrically isolating said electrode from each of said conductive shield means, an aperture formed in said tubular conductive outer shield means adjacent said electrode, a generally rod-like conductive terminal member connected to said electrode and extending through said insulation and outwardly of said aperture in spaced relation to the margins of said aperture, said tubular insulation electrically insulating said terminal member from said tubular conductive outer shield means wherein a potential difference exists therebetween when said cable conductor is energized.

2. The combination set forth in claim 1 wherein an annular resistor is disposed within said aperture with its outer peripheral surface engaging the margin of said aperture, a second terminal means engaging the inner annular surface of said annular resistor, a third terminal means connected to said electrode and extending into said aperture, and an indicating means disposed within said aperture and being selectively operable to interconnect said second and third terminal means.

3. The combination set forth in claim 2 wherein said indicating means includes glow-lamp means mounted for axial movement within said aperture, means biasing said glow-lamp means outwardly of said aperture and into a disconnected position relative to said second and third terminal means, said glow-lamp means being movable inwardly of said aperture for bridging said second and third terminal means.

References Cited

UNITED STATES PATENTS

| | | | |
|---|---|---|---|
| 1,788,873 | 1/1931 | Jansson | 174—31 X |
| 2,610,237 | 9/1952 | Benner | 324—133 X |
| 2,937,359 | 5/1960 | Cronin et al. | 174—152 X |

FOREIGN PATENTS

| | | |
|---|---|---|
| 620,822 | 3/1949 | Great Britain. |
| 830,073 | 3/1960 | Great Britain. |
| 838,782 | 6/1960 | Great Britain. |

LARAMIE E. ASKIN, *Primary Examiner.*